Jan. 27, 1970   B. L. A. VAN DER SCHEE   3,491,403
APPARATUS FOR TREATING VISCOUS PLASTIC MATERIALS
Filed April 26, 1967   3 Sheets-Sheet 1

INVENTOR.
BERNARD L.A. VAN DER SCHEE
BY

INVENTOR.
BERNARD L.A. VAN DER SCHEE

INVENTOR.
BERNARD L. A. VAN DER SCHEE 3,491,403
APPARATUS FOR TREATING VISCOUS PLASTIC MATERIALS
Bernard L. A. van der Schee, Velp, Gelderland, Netherlands, assignor to American Enka Corporation, Enka, N.C., a corporation of Delaware
Filed Apr. 26, 1967, Ser. No. 633,936
Claims priority, application Netherlands, May 5, 1966, 6606080
Int. Cl. B29h 8/00
U.S. Cl. 18—2      2 Claims

ABSTRACT OF THE DISCLOSURE

In an apparatus for mixing and degassifying viscous plastic-like materials comprising two adjacently spaced, substantially parallel rolls, a drive system for rotating said rolls in opposite directions into an upper nip area between said rolls to continuously shape said materials into thin layers or films on the surface of said rolls, a material inlet located at one end of said rolls, means extending into said nip area for increasing the surface area of the material being treated therein, the improvement comprising means for controlling the degree of increase in the surface area of said layers or films while effecting an improved intermixing of the constituent materials thereof, said means comprising an elongated bar-like member positioned over the entire length of said rolls beneath said roll nip area in parallel contact with both layers or films formed on said rolls but offset in closer contact with the layer or film formed on one of said rolls, the layer or film contact surface of said bar-like member being beveled to a knife-edge.

---

This invention relates to apparatus for treating viscous plastic-like materials and is particularly useful for blending, mixing or degassifying reactive materials of polymerization. More precisely, this invention concerns improvements over U.S. Patent 3,345,041, filed Dec. 23, 1963, commonly assigned herewith and relating to a method and apparatus for intermixing and/or polymerizing highly viscous materials.

In the above-mentioned patent, highly viscous substances such as polyolefins, polyesters, polyamides, elastomers, such as natural and/or synthetic rubber stock and the like, are subjected to a mixing and blending operation by the use of an apparatus consisting of two spaced, essentially parallel, rolls which cooperate to form a material receiving trough area between their upper surfaces. The rolls are supported in journal bearings fixed in an apppropriate frame structure which may or may not be supported in an enclosed vessel. Simultaneous rotation of the rolls in opposite directions causes a viscous gob of the materials superimposed on the roll surfaces and in the trough to be drawn into a so-called nip area located between the rolls. On passing through the nip, the material is formed into a sheet and the sheet upon leaving the nip is separated into two relatively thin films which adhere to respective roll surfaces. The films are circumferentially transported by the roll surfaces back into the rotating gob of material located in the trough area between the rolls where they are once again blended into a viscous mass.

In order to improve the blending, mixing and degassification of viscous plastic films formed by and superimposed on the roll surfaces, the apparatus as set out in the application provides a prong consisting of a plurality of hollow, open ended teeth that extend from above the rotating viscous gob, down through the gob, terminating in the nip area of the rolls. The hollow teeth communicate with the exterior atmosphere and act to divide the material passing through the nip into a series of upstanding membranes or ribs perpendicular to the plane of the film formed on each roll surface. By virtue of their plural surfaces, the upstanding ribs increase the surface area of the film on each roll as much as 200–400%, depending upon the particular relationship of the teeth to the nip area of the rolls. Because of this increased surface area, undesirable gaseous components are more effectively removed from the viscous materials when a partial vacuum is maintained in a vessel supporting and enclosing the system.

Although the apparatus as defined in the earlier patent improves the mixing, blending and degassification of viscous materials, it has several notable disadvantages which, generally speaking, cannot be effectively controlled or avoided merely by an operator of the apparatus and when such apparatus is constructed symmetrically, i.e., when the apparatus is constructed with the parallel axis of the rolls being spaced equidistant along their entire length. Complete and thorough intermixing of the viscous material is difficult and, in some applications, almost impossible to achieve. This is especially true when treating materials composed of two or more different compositions, or, when pigments, plasticizers, accelerators, stabilizers or additional matter are to be included.

It has been also observed that the height of the ribs formed is virtually independent of the speed of the rollers and the viscosity of the liquid mass being treated and consequently, in some applications, the height increases to a point where continual contact is made with the walls of the vessel in which the rolls are supported.

In either case, the energy consumption is excessive in that the mixing time is often lengthy.

It is an object of the present invention to overcome the obvious disadvantages associated with the blending apparatus mentioned above.

It is a further object of this invention to provide an improved apparatus for effectively blending, mixing and degassifying highly viscous plastic-like materials.

Another object of this invention is to provide a blending apparatus for effectively polymerizing highly viscous materials in which complete degassification of the material is desirable.

The manner in which these and other objects of the invention are obtained will become more apparent with the following description of the invention which is intended to be illustrative rather than limitative.

In brief, it has now been discovered that contact of the rib-like viscous material with the interior walls of a vessel can be avoided and that better intermixing of the plastic materials can be accomplished in a surprisingly simple but yet effective manner. The inventive improvement herein contemplated consists in positioning an elongated rod or bar-like element in the vicinity of the rolls which advantageously effectively controls the rib height and under certain critical conditions as set forth in more detail below insures an improved intermixing of the viscous materials superimposed thereon.

In one modification, it has been found that the height of the ribs can be controlled quite satisfactorily and improved mixing can be achieved by merely varying the distance at which an elongated rod-like member extends vertically into the trough area between the rolls.

Contact between the elongated rod and the viscous materials mentioned herein must be made, however; otherwise, the intended function of reducing rib height will not be realized and the mixing rolls will function solely in a conventional manner. When properly positioned, the bar will produce a zig-zag pattern in the ribs passing over and hence it is necessary that the bar be positioned in a manner so it at least contacts the surface of the main body of the sheet or film. The ribs flowing over and under the bar are changed in their radial speed by a local retardation around the surface of the bar. This retardation does not act to increase the thickness of the upstanding ribs but quite surprisingly, and believed primarily caused by the material's viscosity, the rib is folded in a zig-zag pattern as it passes the bar and with the height of the ribs being reduced.

As is critical to effect proper intermixing of surface films on the rolls, at least one bar must be provided which is offset somewhat in respect to its planar relationship with the rolls. In other words, it is possible to provide complete intermixing of the materials in a much shorter time by positioning a bar closer to one roll surface than the other.

The bar therefore should be constructed so that it is not only adjustable vertically but also horizontally. Simple lever means, pivoted upon a fulcrum, can be used to effectively control a so-called "clearance profile" existing between the bar and the rolls. Vertical adjustment of the bar can be realized by the use of adjusting screws or threaded rod means, preferably located at each end thereof.

The leading end of the bar or the end first coming into contact of the material being mixed should be beveled to a knife-edge with the bar extending over the entire length of the rolls.

A plurality of bars that are spaced with varying clearance profiles between the rolls will likewise effect increased mixing of the materials in a satisfactory manner—providing at least one bar is positioned closer to one roll surface than the other. In other words, one bar can be used to control the rib height of one roll surface while another, being in closer proximity to a second roll surface, acts to increase the mixing intensity of the materials between the rolls.

As employed herein, the terms "substance," "material" or "plastic materials" are intended to include those viscous plastic-like liquids including polymers, natural rubber and the like.

The invention will now be further described with reference to the accompanying drawing which shows an apparatus especially adapted to facilitate an increase in the chain length of a linear polycondensate of ethylene terephthalate. The improved apparatus as defined in detail below serves to evaporate effluent glycol from the mixture of reactants being treated therein.

Figure 1:
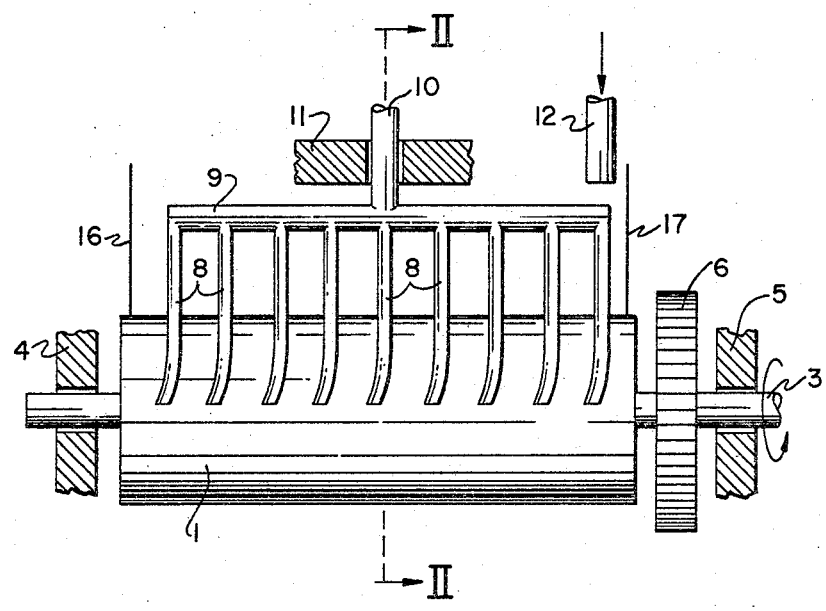
FIGURE 1 shows apparatus in longitudinal section along the line I—I in FIGURE 2.
Figure 2:
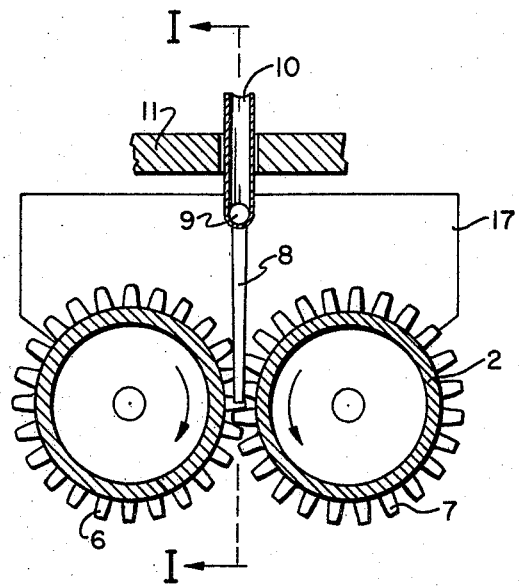
FIGURE 2 is a cross-sectional view along the line II—II in FIGURE 1.

As is apparent in FIGURES 1 and 2, reference numerals 1 and 2 illustrate two spaced, parallel, cylindrical roll assemblies. Roll 2 is mounted on a freely rotatable shaft (not shown), and roll 1 is mounted on shaft 3. The rolls are driven in the direction indicated by the arrow. Shaft 3 is mounted for rotation in bearings 4 and 5. The rolls 1 and 2 are intercoupled by means of gears 6 and 7 in such a way that they can be driven in opposite directions (see the arrows), and at equal speeds. A prong having protruding hollow teeth 8 extends downwardly to between the rollers. Teeth 8 are, via a distribution tube 9, connected to a fixation tube 10. Tube 10 is adjustably attached to a support frame indicated at 11. Polyethylene terephthalate to be further condensed may be fed into the apparatus by way of a supply line 12.

As a result of the somewhat curved shape of the teeth 8, the polycondensate, when the apparatus is in operation, is slowly transported to the other end of the rolls where it is removed by a scraper and discharged from the apparatus through an appropriate line.

The details of scraper design and the removal means in general are left out of the drawings for the sake of simplicity, but it should be understood that the construction thereof will be obvious to a man skilled in the art. The drawings do not show the driving mechanism for the shaft 3, a vacuum-tight encasement or vessel in which the apparatus is housed, and a connection through the wall of this encasement to a system for creating a vacuum around the apparatus and inside the vessel for the same reason, especially since such construction is not part of the invention as disclosed.

Figure 3:
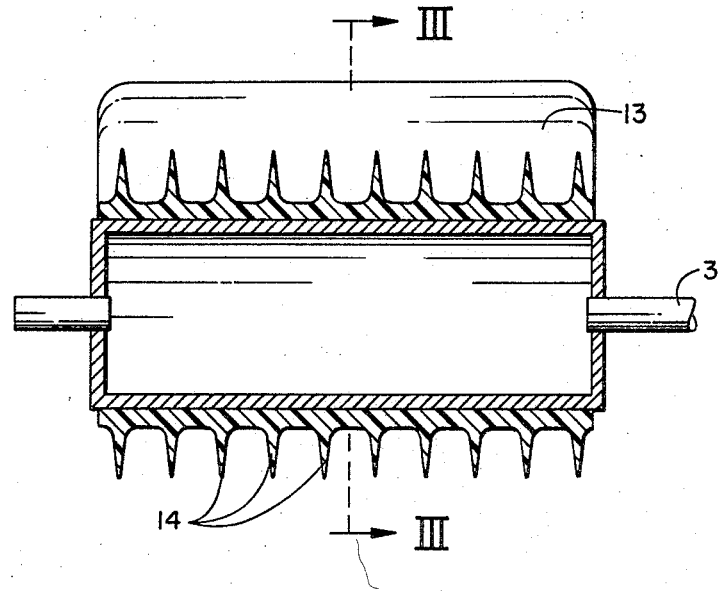
FIGURES 3 and 4 show, in cross-section and in longitudinal section along the lines III—III and IV—IV, respectively, the profile of the reaction mixture which is being treated.

As can best be seen in FIGURE 3, a portion of the viscous material will stay between and on the rolls as a somewhat sagging bank or gob of material, as illustrated at 13. Gob 13 is maintained in the trough between partitions 16 and 17. The position of the gob is extremely stable and its general shape is governed by the material's viscosity and the speed of the rolls. The greater the viscosity and/or the speed of the rolls, the more a free surface of the gob 13 will approach the shape of a cylinder. The liquid material circulates vigorously in directions indicated roughly by the arrows illustrated within the gob. Part of the substance will continuously be transported by the rolls to the nip in a downward direction.

This liquid material is separated into two films, each of which is supported on a roll and thereafter pressed back into the gob 13 at the top in the trough between the rolls. Owing to the presence of teeth 8, the two liquid films acquire a unique shape in that the films become much thinner between the teeth and consequently upstanding membranous ribs 14 are formed (see FIGURES 3 and 4). The height of these ribs may, for example, be 1.5 to 2 times the width of the valleys therebetween and, as a direct result, a surface enlargement of 300 to 400% of a normal flat film surface is realized. This in itself causes the rate at which vaporous components e.g., glycol, evolve from the reaction mixture to be accelerated by a factor of 4 to 5.

Figure 5:
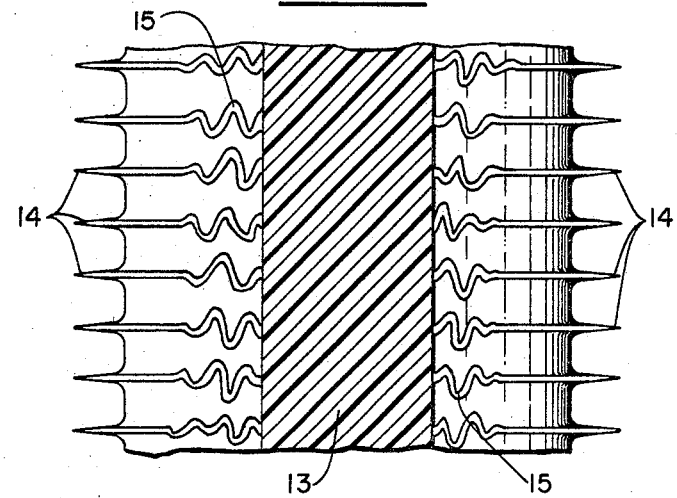
FIGURE 5 is a plan view, along the line V—V in FIGURE 3, of the liquid ribs produced.

The material is mixed, blended and homogenized at the points where the ribs thereof are pressed into the gob 13. As best seen in FIGURES 3 and 5 (a plan view taken along the line V—V in FIGURE 3), the ribs depart from their own vertical planes upon passing into the gob and are folded into several recurring pleats 15. The degassified liquid portions to a very large extent spread sideways and, as a direct result, a rapid diffusion of glycol towards fresh rib surfaces that are yet to be formed will be facilitated.

Figure 4:
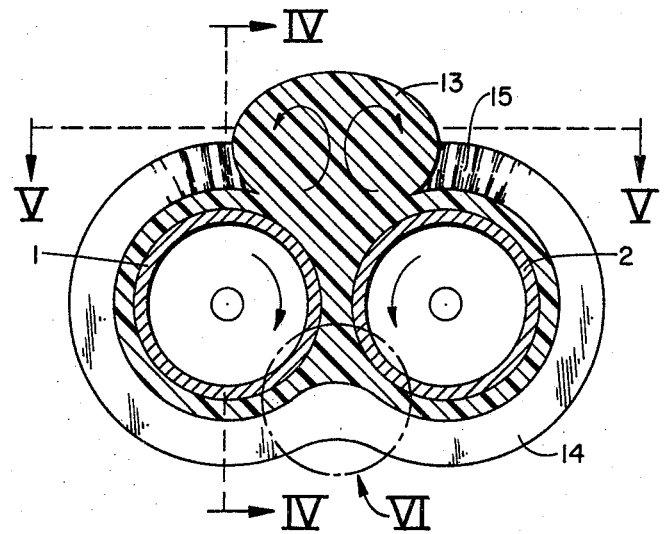
Figure 6:
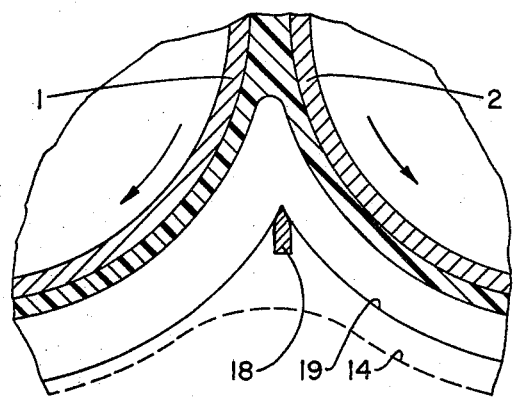
FIGURE 6 represents of an enlarged scale a detail of FIGURE 4 indicated by VI below which there is shown a rod-shaped element according to the invention.

FIGURE 6 shows, on an enlarged scale, the detail indicated by the reference character VI in FIGURE 4. Numeral 18 refers to a bar which is pressed into the upstanding ribs 14 at the points of the formation thereof. Broken line 14 graphically illustrates the form of undisturbed ribs. Owing to the presence of the bar 18, the ribs acquire a quite different shape as illustrated at 19. The bar is shown offset somewhat from a plane of symmetry between the rolls 1 and 2 and, as a direct result, the ribs around roll 2 are not as high as the ribs around roll 1. A continual flow of the material being treated from roll 2 to roll 1 therefore exists.

Apart from the fact that the ribs around rolls 1 and 2 have different heights, it will be obvious from FIGURE 6 that all ribs are lower than the ribs having the undisturbed shape as shown at 14. Depending on the position of bar 18, any rib height and any ratio of rib heights may be realized. Of equal significance and during operation of the device, the flow picture may be changed in any desired manner by merely displacing bar 18. The present improvement has made it possible to use the apparatus in many different ways, irrespective of the speed and the viscosity of the liquid. Moreover, an apparatus of reduced size can now be visualized and with equal or better mixing of the material and components thereof being achieved.

What is claimed is:

1. In an apparatus for mixing and degassifying viscous plastic-like materials comprising two adjacently spaced, substantially parallel rolls, a drive system for rotating said rolls in opposite directions into an upper nip area between said rolls to continuously shape said materials into thin layers or films on the surface of said rolls, a material inlet located at one end of said rolls, means extending into said nip area for increasing the surface area of the material being treated therein, the improvement comprising means for controlling the degree of increase in the surface area of said layers or films while effecting an improved intermixing of the constituent materials thereof, said means comprising an elongated bar-like member positioned over the entire length of said rolls beneath said roll nip area in parallel contact with both layers or films formed on said rolls but offset in closer contact with the layer or film formed on one of said rolls, the layer or film contact surface of said bar-like member being beveled to a knife-edge.

2. In an apparatus for mixing and degassifying viscous plastic-like materials comprising two adjacently spaced, substantially parallel rolls, a drive system for rotating said rolls in opposite directions into an upper nip area between said rolls to continuously shape said materials into thin layers or films on the surface of said rolls, a material inlet located at one end of said rolls, a comb device positioned above said rolls, said device having a plurality of hollow-open-ended teeth extending into the roll nip area in the direction of the rotation of said rolls and a header connecting said hollow teeth in fluid flow relationship and a fluid supply pipe supporting the comb device and communicating with said header, the improvement comprising means for controlling the degree of increase in the surface area of said layers or films while effecting an improved intermixing of the constituent materials thereof, said means comprising an elongated bar-like member positioned over the entire length of said rolls beneath said roll nip area in parallel contact with both layers or films formed on said rolls but offset in closer contact with the layer or film formed on one of said rolls, the layer or film contact surface of said bar-like member being beveled to a knife-edge.

References Cited

UNITED STATES PATENTS

| 2,908,042 | 10/1959 | Snyder | 18—2 X |
| 3,336,008 | 8/1967 | Zoethout | 18—2 X |

FOREIGN PATENTS

| 1,424,917 | 12/1965 | France. |
| 6,413,496 | 5/1966 | Netherlands. |

WILLIAM J. STEPHENSON, Primary Examiner

U.S. Cl. X.R.

259—6